(12) United States Patent
Rochell et al.

(10) Patent No.: US 10,974,558 B2
(45) Date of Patent: Apr. 13, 2021

(54) CHECK RAIL WITH A PIVOT BEARING

(71) Applicant: Benteler Automobiltechnik GmbH, Paderborn (DE)

(72) Inventors: Dirk Rochell, Paderborn (DE); Johannes Boeke, Blomberg (DE); Oleg Schelesnikow, Bielefeld (DE); Frank Fetscher, Hoevelhof (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 198 days.

(21) Appl. No.: 15/957,034

(22) Filed: Apr. 19, 2018

(65) Prior Publication Data

US 2018/0312026 A1    Nov. 1, 2018

(30) Foreign Application Priority Data

Apr. 27, 2017    (DE) .................... 10 2017 109 063.0

(51) Int. Cl.
| | |
|---|---|
| *B60G 7/00* | (2006.01) |
| *B60G 11/10* | (2006.01) |
| *B60G 7/02* | (2006.01) |
| *B60G 11/08* | (2006.01) |
| *F16F 1/368* | (2006.01) |

(52) U.S. Cl.
CPC ............... *B60G 7/001* (2013.01); *B60G 7/02* (2013.01); *B60G 11/08* (2013.01); *B60G 11/10* (2013.01); *B60G 2202/114* (2013.01); *B60G 2204/121* (2013.01); *B60G 2204/41* (2013.01); *B60G 2206/7101* (2013.01); *F16F 1/3683* (2013.01); *F16F 1/3686* (2013.01)

(58) Field of Classification Search
CPC ......... B60G 7/001; B60G 7/02; B60G 11/08; B60G 11/10; B60G 2202/114; B60G 2204/41; B60G 2204/121; B60G 2206/7101; E01B 25/24; B61F 5/325; F16F 1/3683
See application file for complete search history.

(56) References Cited

U.S. PATENT DOCUMENTS

| 1,716,716 A * | 6/1929 | Wright ................... B60G 11/08 |
| | | 267/244 |
| 1,722,206 A * | 7/1929 | Gatter ................... B60G 11/08 |
| | | 180/348 |

(Continued)

FOREIGN PATENT DOCUMENTS

| CN | 105501014 A | 4/2016 |
| CN | 106051012 A | 10/2016 |

(Continued)

*Primary Examiner* — Karen Beck
(74) *Attorney, Agent, or Firm* — Holland & Hart LLP

(57) ABSTRACT

The disclosure relates to a check rail for a wheel suspension of a wheel in a vehicle, wherein the wheel suspension may include a wheel carrier configured to support a wheel of a vehicle, the wheel carrier may include an elastic check rail body that may include a fiber-reinforced composite material with a first check rail end and a second check rail end, wherein the first check rail end is configured to be fastened to a structural body component of the vehicle, wherein the first check rail end is constructed without a bearing; and a pivot bearing on the second check rail end and configured to be rotatably fastened on the wheel carrier.

17 Claims, 3 Drawing Sheets

(56) References Cited

U.S. PATENT DOCUMENTS

| | | | | |
|---|---|---|---|---|
| 2,045,210 A * | 6/1936 | Wagner | ............. | B60G 3/28 |
| | | | | 267/230 |
| 3,630,541 A * | 12/1971 | Carlson | ............. | B60G 11/27 |
| | | | | 280/124.116 |
| 3,667,988 A * | 6/1972 | Horiki | ............. | B05D 1/32 |
| | | | | 427/282 |
| 3,860,259 A * | 1/1975 | Allison | ............. | B60G 9/00 |
| | | | | 280/124.17 |
| 4,143,888 A * | 3/1979 | Heinig | ............. | B60G 3/28 |
| | | | | 267/227 |
| 4,771,997 A * | 9/1988 | Haldenwanger | ...... | F16F 1/3686 |
| | | | | 267/260 |
| 4,772,044 A * | 9/1988 | Booher | ............. | B29C 70/52 |
| | | | | 267/149 |
| 4,773,631 A * | 9/1988 | De Goncourt | ............. | F16F 1/28 |
| | | | | 267/47 |
| 4,872,653 A * | 10/1989 | Chuchua | ............. | B60G 11/12 |
| | | | | 267/271 |
| 5,722,784 A * | 3/1998 | Link | ............. | F16C 33/6607 |
| | | | | 403/158 |
| 6,123,349 A * | 9/2000 | Depue | ............. | B60G 9/003 |
| | | | | 280/124.106 |
| 6,601,836 B1 * | 8/2003 | Dankow | ............. | B60G 11/12 |
| | | | | 267/268 |
| 6,991,223 B2 * | 1/2006 | Platner | ............. | B60G 7/04 |
| | | | | 267/260 |
| 8,485,543 B2 * | 7/2013 | Richardson | ............. | B60G 3/20 |
| | | | | 280/124.109 |
| 9,421,837 B2 * | 8/2016 | Lake | ............. | B60G 11/10 |
| 9,630,467 B2 * | 4/2017 | Soles | ............. | B60G 11/12 |
| 9,657,799 B2 * | 5/2017 | Spiegel | ............. | B60G 11/02 |
| 2008/0007022 A1 * | 1/2008 | Jones | ............. | B60G 3/10 |
| | | | | 280/124.13 |
| 2010/0052282 A1 * | 3/2010 | Baumer | ............. | B60G 7/005 |
| | | | | 280/124.107 |
| 2010/0276901 A1 * | 11/2010 | Richardson | ............. | B60G 3/20 |
| | | | | 280/93.512 |
| 2013/0241167 A1 * | 9/2013 | Perri | ............. | B60G 11/08 |
| | | | | 280/124.134 |
| 2014/0167339 A1 * | 6/2014 | Wagner | ............. | B60G 11/08 |
| | | | | 267/260 |
| 2015/0102575 A1 * | 4/2015 | Lake | ............. | B60G 11/10 |
| | | | | 280/124.107 |
| 2016/0207369 A1 * | 7/2016 | Krahn | ............. | F16F 7/12 |
| 2016/0297270 A1 * | 10/2016 | Soles | ............. | B60G 11/12 |
| 2018/0354329 A1 * | 12/2018 | Zhang | ............. | B60G 11/08 |

FOREIGN PATENT DOCUMENTS

| | | |
|---|---|---|
| DE | 1 079 964 B | 4/1960 |
| DE | 42 07 405 A1 | 1/1993 |
| DE | 10 2011 083 173 A1 | 3/2013 |
| WO | WO 2015/132298 A1 | 9/2015 |

* cited by examiner

CHECK RAIL WITH A PIVOT BEARING

CROSS-REFERENCE TO RELATED APPLICATIONS

This application claims priority to German patent application No. 10 2017 109 063.0, entitled "RADLENKER MIT EINEM DREHLAGER", and filed on Apr. 27, 2017 by the Applicant of this application. The entire disclosure of the German application is incorporated herein by reference for all purposes.

BACKGROUND

The present disclosure relates to a check rail with a pivot bearing for a wheel suspension in a vehicle, in particular a transversal check rail with a pivot bearing.

Check rails for a wheel suspension of a vehicle are usually constructed a sheet check rails, elastomer hybrid check rails or aluminum check rails in strand-pressed or extruded form. A check rail is typically realized by a check rail body with a bearing receptacle for receiving a bearing on at least one end of the check rail body.

SUMMARY

The present disclosure has the problem of creating an improved check rail.

This problem is solved by the features of the independent claim. Advantageous examples of the disclosure are subject matter of the dependent claims, of the specification and of the attached drawings.

The disclosure is based on the recognition that the above problem can be solved by a check rail with an elastic check rail body consisting of a fiber-reinforced plastic composite material whose first check rail end can be fastened to a structural body component of the vehicle and whose second check rail end is connected by a pivot bearing to the wheel carrier.

This can make possible an especially effective connection of the check rail to the vehicle body as well as to the wheel carrier, wherein forces acting on the check rail can be effectively received. Therefore, the function of a wheel guide of a check rail can be combined with a function of a helical spring, pneumatic spring and/or of a leaf spring.

According to one aspect, the disclosure relates to a check rail for a wheel suspension of a wheel in a vehicle, wherein the wheel suspension comprises a wheel carrier for supporting a wheel of a vehicle, with an elastic check rail body consisting of a fiber-reinforced composite material with a first check rail end and a second check rail end, wherein the first check rail end is constructed without a bearing; and with a pivot bearing which is arranged on the second check rail end and can be rotatably fastened on the wheel carrier.

An elastic check rail body formed from a fiber-reinforced plastic composite material has especially advantageous mechanical properties and a low intrinsic weight and can be readily and economically adapted to various dynamic driving requirements and to various vehicle types.

An especially effective fastening, in particular by clamping the first cheek rail end on the structural body component, can be ensured by fastening the first check rail end on the structural body component.

On the other hand, the pivot bearing, which is arranged on the second check rail end, makes possible a rotatable fastening of the check rail on the wheel carrier. Transverse stresses acting. e.g. on the wheel carrier can be effectively absorbed by the rotatable fastening of the second check rail end on the wheel carrier, in particular by the possibility of the torsion of a torsion-soft pivot bearing.

Therefore, the function of a wheel guide of a check rail can be combined with a function of a helical spring, pneumatic spring and/or of a leaf spring by the check rail according to the present disclosure.

In one example, the first check rail end can be elastically fastened to the structural body component or the first check rail end can be firmly clamped to the structural body component.

The elastic fastening of the first check rail end on the structural body component ensures that a limited angular change around a transversal axis of the check rail is ensured. An especially effective fastening is ensured by the firm clamping of the first check rail end on the structural body component.

In one example, the first check rail end can be fastened to the structural body component by a clamping connection or a non-positive connection or by a firmly bonded connection.

This achieves the technical advantage that as a result of the cited connection types the first check rail and can be fastened especially effectively on the structural body component.

In one example, the first check rail end comprises at least one fastening opening through which a fastening means, in particular a fastening screw or fastening rivet can run.

This achieves the technical advantage that as a result of the cited fastening means an especially effective fastening of the first check rail end on the structural body component is ensured.

In one example, the first check rail end is shaped in a planar manner or has a section bent around the transversal axis of the check rail and which can be fastened to the structural body component.

This achieves the technical advantage that as a result of the geometric formation of the first check rail end an especially effective fastening of the check rail on the structural body component is ensured. If the first check rail end has a planar shape, the check rail end can be introduced into a corresponding, planar receptacle of the structural body component. If the first check rail end has a bent section, it can be effectively placed on a side of the structural body component and fastened to the structural body component.

In one example, the first check rail end is shaped into a fastening tongue.

This achieves the technical advantage that as a result of the fastening tongue an especially effective fastening of the first check rail end on the structural body component is made possible.

In one example, the structural body component comprises a clamping bearing, wherein the first check rail end is shaped for the introduction into the clamping bearing and can be introduced on the front side into the clamping bearing.

This achieves the technical advantage that as a result of the front-side introduction of the first check rail end into the clamping bearing, an especially effective fastening of the first check rail end on the structural body component is ensured. The clamping bearing fastens the first check rail end by exerting a clamping force on the first check rail end.

In one example, the first check rail end has a straight front side which can be introduced into the clamping bearing and/or the first check rail end has an oblique contact surface on the front side which surface can be introduced into the clamping bearing in order to make a self-locking clamping connection available.

This achieves the technical advantage that the straight front side of the first check rail end can be introduced in an especially advantageous manner into the clamping bearing. An advantageous, self-locking clamping connection can be made available by the oblique contact surface arranged on the front side. This takes place in particular in that the oblique contact surface rests on an opposite, oblique surface of the clamping bearing, and as a result the first check rail end is advantageously held in the clamping bearing.

In one example, at least one elastically deformable stop element is arranged on the first check rail end in order to additionally support an elastic deformation of the check rail about a transversal axis of the check rail.

This achieves the technical advantage that as a result of the at least one elastically deformable stop element an especially effective elastic deformation of the check rail about the transversal axis of the check rail is made possible. If a force is acting on the check rail, the elastic check rail body can elastically deform up to a certain degree. If the force acting on the elastic check rail body is increased, in addition the at least one elastically deformable stop element is also deformed.

In one example, the first check rail end is shaped in a planar manner and the at least one elastically deformable stop element is a rubber plate which can be placed under the first check rail end and/or is a rubber plate which can be placed on the first check rail end, or the first check rail end comprises a section which is bent about a transversal axis of the check rail and the at least one elastically deformable stop element is shaped as a wedge and/or plate which can be inserted between the bent section and the structural body component.

This achieves the technical advantage that one or more rubber plates can be positioned between the planar-shaped check rail end and the structural body component either on one side or on both sides in order to ensure an especially effective elastic deformability. If the elastically deformable, bent section is fastened on the structural body component, a wedge and/or plate that can be inserted between the bent section and the structural body component also ensures an effective elastic deformability.

In one example, the pivot bearing is constructed to carry the second check rail end in the direction of a longitudinal axis of the check rail and in the direction of a check rail transversal axis of the check rail in a traction-proof and/or pressure-proof manner.

This achieves the technical advantage that the pivot bearing does not allow axial movements of the second check rail end along the longitudinal axis of the check rail and along the transversal axis of the check rail, which ensures an especially effective fastening. In particular, the pivot bearing can allow radial movements of the second check rail end in a certain range if forces act on the check rail transversely to the longitudinal axis of the check rail and transversely to the transversal axis of the check rail along a vertical axis of the check rail.

In one example, the check rail body comprises a first body width extending along the transversal axis of the check rail on the first check rail end and the check rail body comprises a second body width extending along the transversal axis of the check rail on the second check rail end, wherein the second body width is smaller than the first body width, or wherein the second body width and the first body width are equally large.

This achieves the technical advantage that an especially advantageous utilization of the available structural space is ensured by the tapering course of the check rail body from the first check rail end to the second check rail end. On the other hand, if the first and the second body widths are equally large, the check rail does not taper from the first check rail end to the second check rail end, as a result of which an alternative structural shape of the check rail is obtained.

In one example, the check rail body has a first body thickness on the first check rail end, the check rail body has a second body thickness on the second check rail end, and the second body thickness is smaller than the first body thickness.

This achieves the technical advantage that as a result of the course of the body thickness of the check rail body which decreases from the first check rail end to the second check rail end, the cross section of the check rail body can be especially effectively adapted to the assembly situation in the vehicle, e.g., by optimizing the weight, and to the forces which occur at this time, wherein in particular the stressing of the check rail can be immediately adjusted.

In one example, the pivot bearing comprises at least one bearing casing or two opposing bearing casings.

This achieves the technical advantage that the pivot bearing can be received especially effectively in the at least one bearing casing.

In one example, the pivot bearing is connected to the second check rail end by a non-positive connection, by a positive connection or by a screw connection.

This achieves the technical advantage that an especially effective and stable fastening of the pivot hearing to the second check rail end can be ensured.

In one example, the pivot bearing comprises a clamping bearing for receiving the second check rail end.

This achieves the technical advantage that the second check rail end can be introduced in an especially effective manner into the clamping bearing.

In one example, the pivot bearing is thrilled from metal, in particular from aluminum.

This achieves the technical advantage that a pivot bearing formed from metal, in particular from aluminum, is especially resistant and at the same time has a low intrinsic weight.

In one example, the pivot bearing is formed by a barrel-shaped roller bearing.

This achieves the technical advantage that a barrel roller bearing can especially effectively receive forces acting on the second check rail end.

In one example, the check rail is designed as a transversal rail of a vehicle.

This achieves the technical advantage that a transversal rail according to the present disclosure ensures an especially effective stabilization of the running gear of the vehicle.

BRIEF DESCRIPTION OF THE DRAWINGS

Examples of the present disclosure are explained in detail with reference made to the attached drawings.

DETAILED DESCRIPTION

Figure 1:
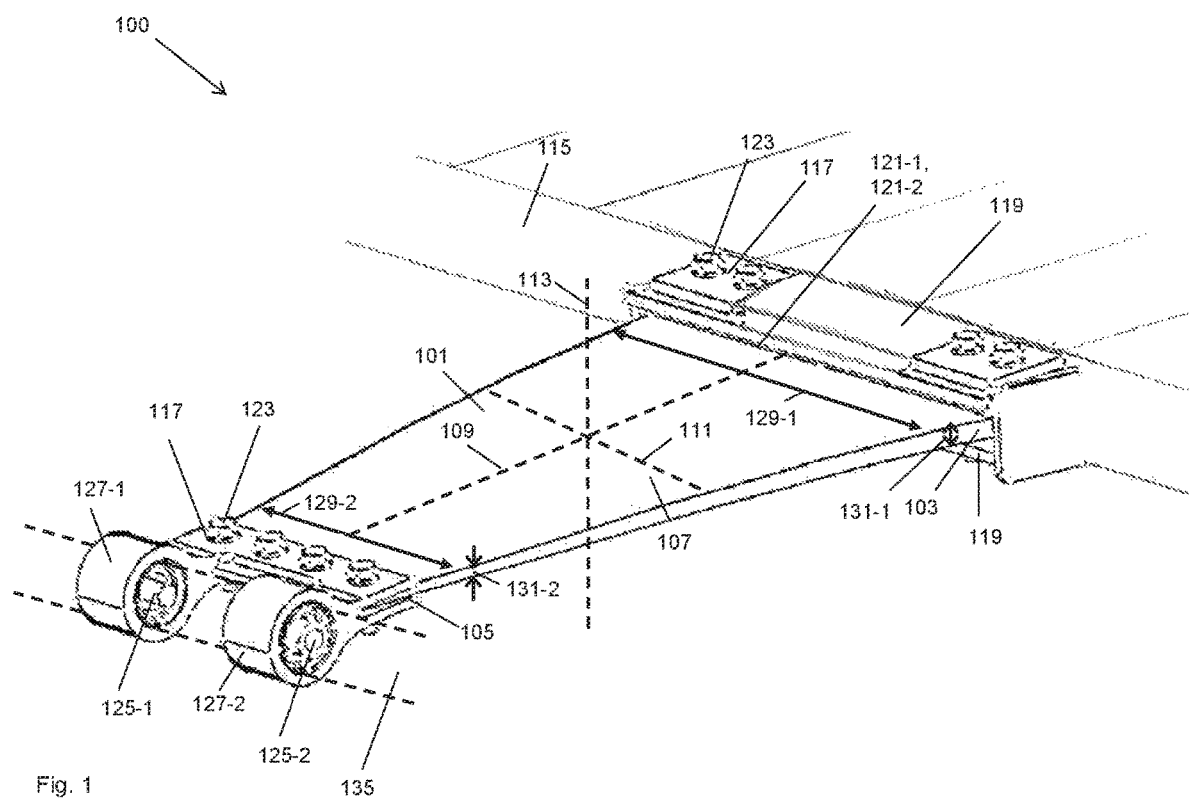
FIG. 1 shows a check rail according to a first example in a side view.

FIG. 1 shows a schematic view of a check rail 100 according to a first example in a side view. The check rail 100 is set into a wheel suspension of a vehicle, wherein the wheel suspension comprises a wheel carrier 135 for supporting a wheel of the vehicle, Therefore, the check rail 100 according to the present disclosure makes possible an effective receiving of forces which act during the travel of the vehicle on the check rail 100.

The check rail 100 comprises an elastic check rail body 101 which comprises a first check rail end 103, a second check rail end 105 and a connection section 107 which connects the first check rail end 103 and the second check rail end 105.

The elastic check rail body 101 extends along a check rail longitudinal axis 109 of the check rail 100, which extends in the check rail body 101 from the first check rail end 103 to the second check rail end 105. A check rail transversal axis 111 extends transversally to the check rail longitudinal axis 109 in the check rail body 101. A check rail vertical axis 113 of the check rail 100 extends away from the check rail body 101 wherein the check rail vertical axis 113 is arranged transversally to the check rail longitudinal axis 109 and transversely to the check rail transversal axis 111.

The check rail 100 shown in FIG. 1 is constructed as a transversal rail 100 wherein the elastic check rail body 101 is formed from a fiber-reinforced plastic composite material (FVK).

In a fiber-reinforced plastic, reinforcement fibers such as, e.g. glass fibers are taken up in a plastic matrix. A fiber-reinforced plastic composite material can be advantageously used in a check rail 100 since it is distinguished by a high specific rigidity and strength in order to ensure advantageous mechanical qualities of the check rail 100. Due to the low weight of fiber-reinforced plastic in comparison, e.g. to steel, the weight of the check rail 100 and therefore also the weight of the vehicle can be advantageously reduced.

In addition, the check rail 100 according to the present disclosure can be readily and economically adapted to various dynamic driving requirements in different types of vehicles.

The first check rail end 103 of the check rail body 101 is fastened to a structural body component 115 of the vehicle by a clamping connection. The structural body component 115 has a fastening opening 117 through which the fastening element 123, in particular a fastening screw or a fastening rivet, is guided in order to ensure a stable fastening. The first planar check rail and 103 is introduced here between body projections 119 of the structural body component 115.

At least one elastically deformable stop element 121-1, 121-2, in particular one or more rubber plates are introduced between the structural body component 115 and the first planar check rail and 103, wherein one of the rubber plates can be placed underneath the first check rail end 103 and/or wherein another one of the rubber plates can be placed on top of the first check rail end 103. This makes possible a slight bending of the check rail body 101 around the check rail longitudinal axis 109 of the check rail 100 by an elastic deformability of the elastically deformable stop elements 121-1, 121-2.

Furthermore, the check rail 100 comprises at least one pivot bearing 125-1, 125-2, in particular a first pivot bearing 125-1 and a second pivot bearing 125-2 which are fastened to the second check rail 105 and are designed to receive forces acting on the second check rail end 105 along the check rail vertical axis 113.

The pivot bearings 125-1, 125-2 are arranged opposite one another on the second check rail end 105.

The pivot hearings 125-1, 125-2 each comprise a bearing casing 127-1, 127-2 or two bearing casings 127-1, 127-2 arranged opposite one another. The pivot bearings 125-1, 125-2, in particular the bearing casings 127-1, 127-2 are fastened here on the second check rail end 105 by a non-positive fastening, in particular by a fastening means 123. The pivot bearings 125-1, 125-2 are formed in particular from aluminum and constructed as barrel-shaped roller bearings.

The pivot bearings 125-1, 125-2 are constructed for supporting the second check rail end 105 in the direction of the check rail longitudinal axis 109 and in the direction of the check rail transversal axis 111 in a traction-proof and/or pressure-proof manner in order to make a stable fastening available between the wheel carrier 135 and the structural body part 115 by the check rail 100.

If, however, forces act along the check rail vertical axis 113 on the check rails 100, in particular transverse rails, the pivot bearings 125-1, 125-2 can receive corresponding forces by a torsion of the pivot bearings 125-1, 125-2, which can reduce or prevent a bending in or a bulging in of the check rail 100 under a side load.

The elastic check rail body 100 is constructed here as a beam, in particular as a cantilever which tapers from the first check rail end 103 to the second check rail end 105. Here, the check rail body 101 has a first body width 129-1 on the first check rail end 103 and the check rail body 101 has a second body width 129-2 on the second check rail end 105, wherein the second body width 129-2 is smaller than the first body width 129-1. The first and the second body widths 129-1, 129-2 can optionally also be equally large.

At the same time the body thickness of the check rail body 101 tapers from the first check rail end 103 to the second check rail end 105. Here, the check rail body 101 has a first body thickness 131-1 on the first check rail end 103 and the check rail body 101 has a second body thickness 131-2 on the second check rail end 105, wherein the second body thickness 131-2 is smaller than the first body thickness 131-1.

As a result of the check rail body 101 which tapers and becomes thinner from the second check rail end 105 to the first check rail end 103, the cross section of the resilient check rail 100 can be adapted to the forces acting on the check rail 100, which results in an optimized distribution of expansion over the entire check rail body 101.

It is possible to adapt the various stiffnesses to different directions according to the geometry of the particular vehicle model by a different arrangement of the pivot bearings 125-1, 125-2 on the second check rail end 105 or by a different design of the pivot bearings 125-1, 125-2.

Therefore, the function of a wheel guide of a check rail 100 can be combined with a function of a helical spring, pneumatic spring and/or of a leaf spring by the check rail 100 according to the present disclosure.

Figure 2:
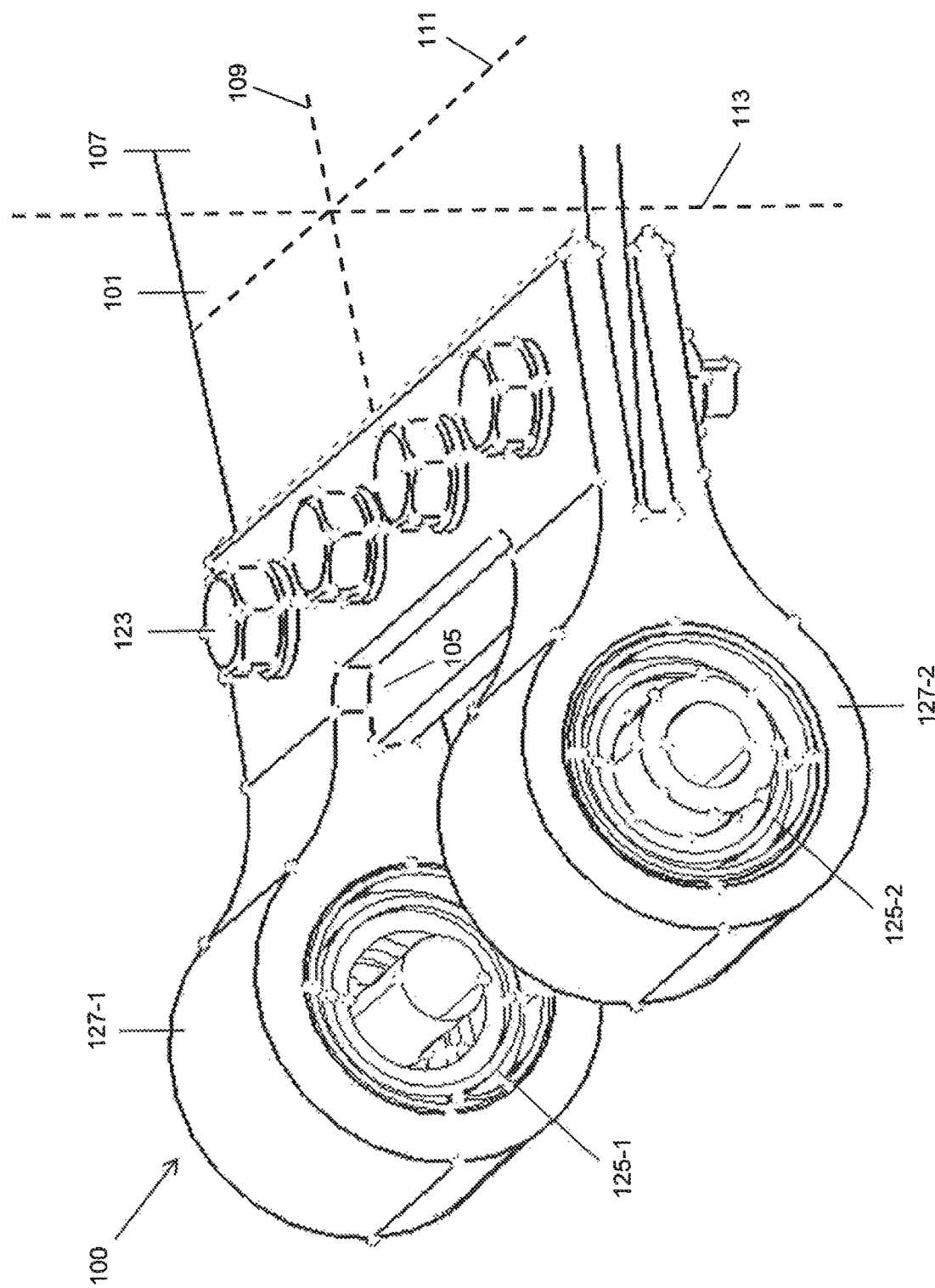
FIG. 2 shows a check rail according to the first example in a perspective view.

FIG. 2 shows a check rail 100 according to the first example in a perspective view. The check rail 100 comprises an elastic check rail body 101 which comprises a first check rail end 103, a second check rail end 105 and a connection section 107 which connects the first check rail end 103 and the second check rail end 105, in the views shown in FIG. 2 the first check rail end 103 is not shown.

FIG. 2 shows a check rail longitudinal axis 109, check rail transversal axis 111 and check rail vertical axis 113 of the check rail 100 according to the first example.

A first and a second pivot hearing 125-1, 125-2 are fastened to the second check rail 105 and are designed to receive forces acting on the second check rail end 105 along the check rail vertical axis 113. The first and the second pivot bearing 125-1, 125-2 are surrounded by a first and a second bearing casing 127-1, 127-2, wherein the first and the second bearing casing 127-1, 127-2 are fastened to the second check rail end 105 by fastening means 123, in particular screws.

The pivot bearings 125-1, 125-2 are constructed here as barrel-shaped roller bearings.

Figure 3:
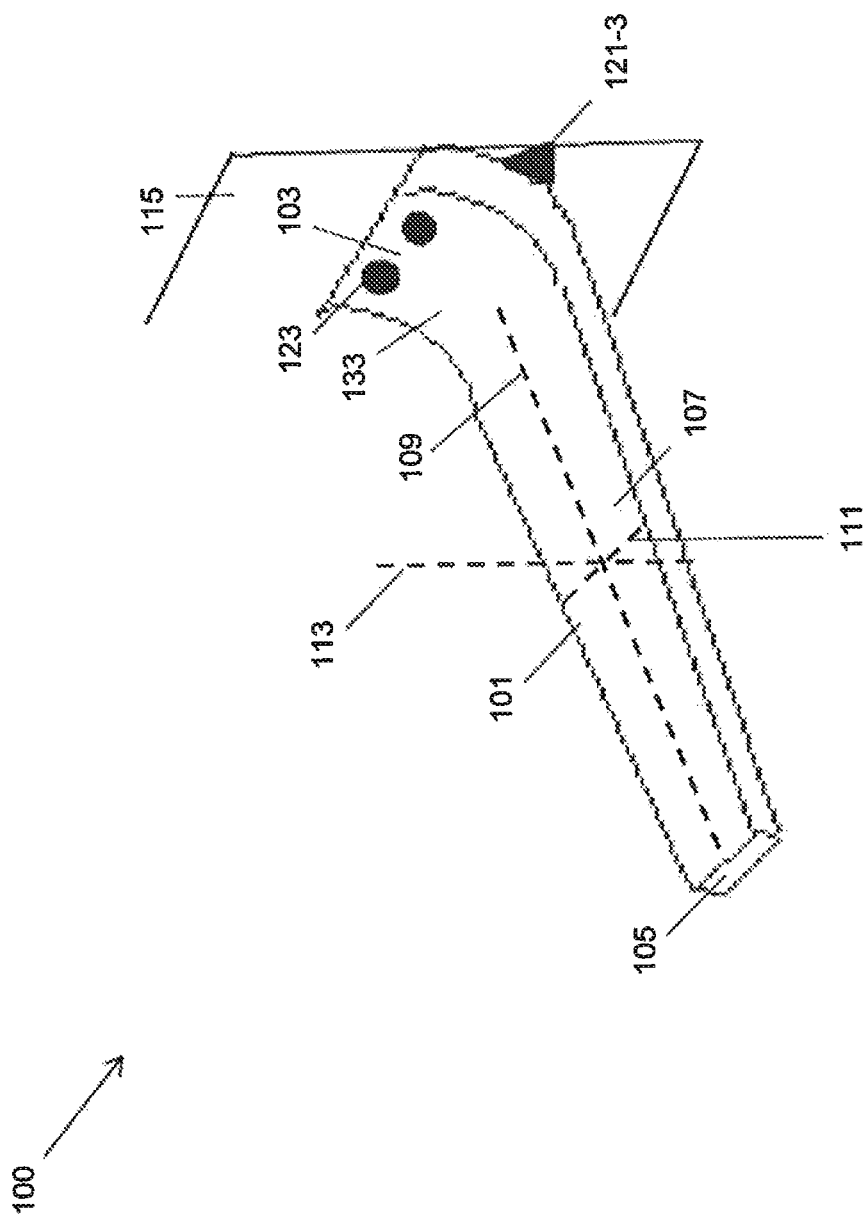
FIG. 3 shows a check rail according to a second example in a schematic view.

FIG. 3 shows a check rail 100 according to a second example in a schematic view. The check rail 100 comprises an elastic check rail body 101 which comprises a first check rail end 103, a second check rail end 105 and a connection section 107 which connects the first check rail end 103 and the second check rail end 105. The pivot bearings 125-1, 125-2 arranged on the second check rail end 105 are not shown in FIG. 3.

FIG. 3 shows a check rail longitudinal axis 109, check rail transversal axis 111 and check rail vertical axis 113 according to the second example.

The check rail body 101 is constructed here as a cantilever which tapers from the first check rail end 103 to the second check rail end 105, wherein the check rail body 101 is L-shaped and the first check rail end 103 has a bent section 133 which is bent around the check rail transversal axis 111.

On the first check rail end 103 the check rail body 101 is firmly fastened to the structural body component 115 by fastening means 123, which can avoid movements in the fastening point. In order to nevertheless make an advantageous angle change possible about the check rail transversal axis 111, an elastically deformable stop element 121-3, in particular a rubber wedge and/or a rubber plate is/are introduced between the structural body component 115 and the first check rail end 103 of the check rail body 101. Here, the at least one elastically deformable stop element 121-3 is fastened to the check rail body 101 in a non-positive or firmly bonded manner.

This can ensure an effective, elastic deformability of the check rail 100 about the check rail transversal axis 111.

LIST OF REFERENCE NUMBERS

100 Check rail
101 Elastic check rail body
103 First check rail end
105 Second check rail end
107 Connection section
109 Check rail transversal axis
111 Check rail transversal axis
113 Check rail vertical axis
115 Structural body component
117 Fastening opening
119 Body projection
121-1 First elastically deformable stop element
121-2 Second elastically deformable stop element
121-3 Third elastically deformable stop element
123 Fastening means
125-1 First pivot bearing
125-2 Second pivot bearing
127-1 First bearing casing
127-2 Second bearing casing
129-1 First body width
129-2 Second body width
131-1 First body thickness
131-2 Second body thickness
133 Bent section
135 Wheel carrier

What is claimed is:

1. A check rail for a wheel suspension in a vehicle, wherein the wheel suspension comprises:
   a wheel carrier configured to support a wheel of the vehicle, the wheel carrier comprising:
   an elastic check rail body comprising a fiber-reinforced plastic composite material with a first check rail end and a second check rail end, wherein the first check rail end is configured to be fastened to a structural body component of the vehicle, wherein the first check rail end is constructed without a bearing; and
   a pivot bearing on the second check rail end and configured to be rotatably fastened on the wheel carrier, wherein the structural body component comprises a clamping bearing, wherein the first check rail end is shaped for being introduced into the clamping bearing and is configured to be introduced on a front side into the clamping bearing;
   wherein the pivot bearing is configured to carry the second check rail end in a direction of a longitudinal axis of the check rail and in a direction of a check rail transversal axis of the check rail in a traction-proof manner, a pressure-proof manner, or some combination thereof, and wherein the pivot bearing allows radial movements of the second check rail end in a certain range if forces act on the check rail transversely to the longitudinal axis of the check rail and transversely to the transversal axis of the check rail along a vertical axis of the check rail;
   wherein the first check rail end comprises the front side as straight and configured to be introduced into the clamping bearing to make a self-locking clamping connection, the first check rail end comprises an oblique contact surface on the front side configured to be introduced into the clamping bearing to make a self-locking clamping connection, or some combination thereof.

2. The check rail according to claim 1, wherein the first check rail end is configured to be elastically fastened or firmly clamped to the structural body component.

3. The check rail according to claim 1, wherein the first check rail end is configured to be fastened to the structural body component by a clamping connection, a non-positive connection, by a firmly bonded connection, or by a positive connection.

4. The check rail according to claim 1, wherein the first check rail end comprises at least one fastening opening, wherein a fastening means is configured to run through the at least one fastening opening.

5. The check rail according to claim 4, wherein the fastener is a fastening screw or fastening rivet.

6. The check rail according to claim 1, wherein the first check rail end is formed to be planar or comprises a section bent around a check rail transversal axis, wherein the section is configured to be placed on the structural body component and to be fastened to the structural body component.

7. The check rail according to claim 1, wherein the first check rail end is shaped into a fastening tongue.

8. The check rail according to claim 1, wherein at least one elastically deformable stop element on the first check rail end is configured to support an elastic deformation of the check rail about a check rail transversal axis.

9. The check rail according to claim 8, wherein the first check rail end is shaped in a planar manner and the at least one elastically deformable stop element is a rubber plate configured to be placed under the first check rail end, configured to be placed on the first check rail end, configured to be set on the first check rail end, or some combination thereof, or wherein the first check rail end comprises a section bent about a transversal axis of the check rail and the at least one elastically deformable stop element is shaped as a wedge, plate, or some combination thereof configured to be inserted between the bent section and the structural body component.

10. The check rail according to claim 1, wherein the check rail body comprises a first body width extending along the transversal axis of the check rail on the first check rail end, and wherein the check rail body further comprises a second body width extending along the transversal axis of the check rail on the second check rail end, and wherein the second body width is smaller than the first body width, or wherein the second body width and the first body width are equal.

11. The check rail according to claim 1, wherein the check rail body comprises a first body thickness on the first check rail end, and wherein the check rail body further comprises a second body thickness on the second check rail end, and wherein the second body thickness is smaller than the first body thickness.

12. The check rail according to claim 1, wherein the pivot bearing comprises one bearing casing or at least two bearing casings opposite one another.

13. The check rail according to claim 1, wherein the pivot bearing is connected to the second check rail end by a by a non-positive connection, by a positive connection, by a screw connection, or by a clamping connection.

14. The check rail according to claim 13, wherein the pivot bearing comprises a clamping bearing configured to receive the second check rail end.

15. The check rail according to claim 1, wherein the pivot bearing is shaped from aluminum.

16. The check rail according to claim 1, wherein the pivot bearing is formed by a barrel-shaped roller bearing.

17. The check rail according to claim 1, wherein the check rail is constructed as a transversal rail of the vehicle.

* * * * *